United States Patent
Lim et al.

(10) Patent No.: US 8,134,674 B2
(45) Date of Patent: *Mar. 13, 2012

(54) FRINGE FIELD SWITCHING MODE LIQUID CRYSTAL DISPLAY DEVICE

(75) Inventors: Dong Hun Lim, Gyeonggi-do (KR); Je Hoon Song, Gyeonggi-do (KR); Youn Hak Jeong, Gyeonggi-do (KR); Won Hee Lee, Gyeonggi-do (KR)

(73) Assignee: Hydis Technologies Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,227

(22) Filed: Dec. 14, 2009

(65) Prior Publication Data

US 2010/0171892 A1    Jul. 8, 2010

Related U.S. Application Data

(63) Continuation of application No. 12/026,248, filed on Feb. 5, 2008, now Pat. No. 7,663,724.

(30) Foreign Application Priority Data

Feb. 5, 2007 (KR) .................. 10-2007-0011855
Jul. 18, 2007 (KR) .................. 10-2007-0071631

(51) Int. Cl.
*G02F 1/1343* (2006.01)
(52) U.S. Cl. ........................ 349/142
(58) Field of Classification Search ....... 349/141–142
See application file for complete search history.

(56) References Cited

U.S. PATENT DOCUMENTS

| 7,522,245 | B2 | 4/2009 | Kim et al. |
| 7,663,724 | B2* | 2/2010 | Lim et al. ............. 349/141 |
| 2002/0154262 | A1 | 10/2002 | Yamakita et al. |

FOREIGN PATENT DOCUMENTS

| CN | 1448762 A | 10/2003 |
| JP | 2001033815 A | 2/2001 |
| KR | 20020015046 A | 2/2002 |
| KR | 1020060029690 A | 4/2006 |
| KR | 100341123 B1 | 6/2006 |

OTHER PUBLICATIONS

Dong Hun Lim et al., "High Performance mobile application with the High aperture ratio FFS (HFFS) Technology", Boe-Hydis Technology, Co. Ltd., Ichon-si, Kyoungki-do 467-701, Korea (13 pgs.), Dec. 2006.

* cited by examiner

*Primary Examiner* — Phu Vu
(74) *Attorney, Agent, or Firm* — The Webb Law Firm

(57) ABSTRACT

Disclosed is a Fringe Field Switching (FFS) mode Liquid Crystal Display (LCD) including lower substrate, an upper substrate and a liquid crystal layer interposed between the substrates. Each pixel region is defined by gate lines and data lines formed to cross each other on the lower substrate. Switching devices are disposed at intersections of the gate lines and the data lines. The FFS mode LCD includes a transparent pixel electrode, and a transparent common electrode disposed apart from the transparent pixel electrode by an insulating layer interposed therebetween to adjust a transmittance by applying an electric field to the liquid crystal layer. A metal line of a specific thickness is formed to be electrically connected with the transparent common electrode on or under the transparent common electrode of a non-opening region in which the gate lines and the data lines are formed.

17 Claims, 15 Drawing Sheets

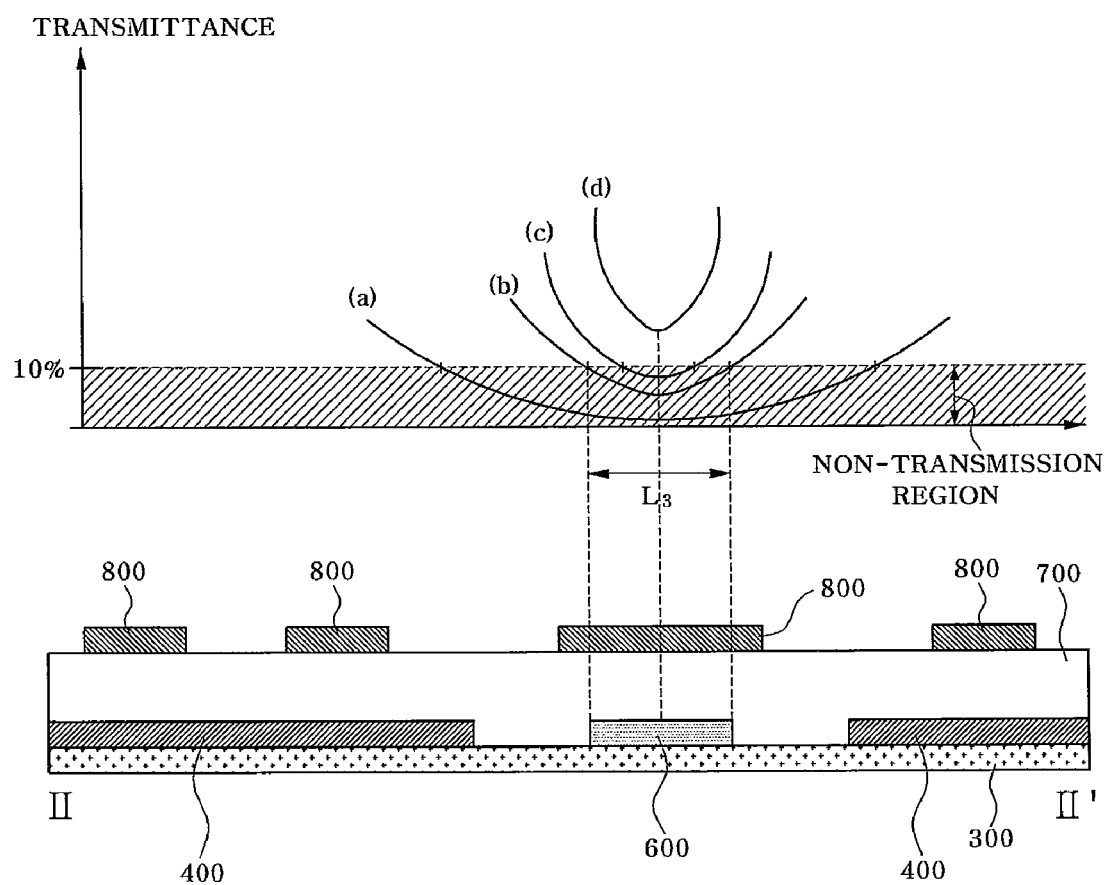

FRINGE FIELD SWITCHING MODE LIQUID CRYSTAL DISPLAY DEVICE

CROSS REFERENCE TO RELATED APPLICATIONS

This application is a continuation of U.S. patent application Ser. No. 12/026,248, filed Feb. 5, 2008 and entitled "Fringe Field Switching Mode Liquid Crystal Display Device", which claimed priority to Korean Patent Application Nos. 10-2007-0011855 and 10-2007-0071631, filed Feb. 5, 2007 and Jul. 18, 2007 respectively, entitled "Liquid Field Switching Mode LCD". The entire contents of the above-referenced applications are incorporated herein by reference.

BACKGROUND OF THE INVENTION

1. Field of the Invention

The present invention relates to a Fringe Field Switching (FFS) mode Liquid Crystal Display (LCD), and more particularly, to an FFS mode LCD having an increased transmittance and aperture ratio at minimum cost without a particular process.

2. Discussion of Related Art

In general, an FFS mode LCD was suggested to improve a low aperture ratio and transmittance of an In-Plane Switching (IPS) mode LCD device, which is disclosed in Korean Patent Application No. 1998-0009243.

In the FFS mode LCD, a common electrode and a pixel electrode are made of a transparent conductor to increase an aperture ratio and transmittance in comparison with the IPS mode LCD, and a space between the common electrode and the pixel electrode is formed narrower than that between upper and lower glass substrates to form a fringe field between the common electrode and the pixel electrode and drive all liquid crystal molecules existing in upper parts of the electrodes, thereby obtaining improved transmittance.

In the FFS mode LCD, however, a shading region for blocking light is generally formed on a data line, which reduces an aperture ratio.

When the shading region is removed to improve the aperture ratio, a Contrast Ratio (CR) deteriorates due to light leakage. Thus, the shading region cannot be removed.

SUMMARY OF THE INVENTION

The present invention is directed to making an electric field formed in a data line different from an electric field formed in the center of a pixel region, and thereby allowing removal of a shading region or reduction of an area in which the shading region is formed.

The present invention is also directed to improving an aperture ratio and also preventing light leakage.

The present invention is further directed to adjusting a slit distance, arrangement, etc., of a data line, a transparent common electrode and a transparent pixel electrode, and thereby providing a Fringe Field Switching (FFS) mode Liquid Crystal Display (LCD) having an increased aperture ratio at the minimum cost without a particular process.

The present invention is still further directed to forming a low-resistance metal line on a transparent common electrode in a non-opening region through which a gate line and a data line pass to make current flow between the metal line and the transparent common electrode and reduce resistance of the transparent common electrode, and thereby providing a high-brightness FFS mode LCD capable of efficiently reducing a common electrode line (Vcom) load in a liquid crystal panel and efficiently solving a picture quality problem, such as greenish, flicker, etc., caused by an increase in Vcom load.

One aspect of the present invention provides an FFS mode LCD in which a lower substrate, an upper substrate and a liquid crystal layer interposed between the substrates are included, each pixel region is defined by gate lines and data lines formed to cross each other on the lower substrate, and switching devices are disposed at intersections of the gate lines and the data lines, wherein the FFS mode LCD includes a transparent pixel electrode, and a transparent common electrode disposed apart from the transparent pixel electrode by an insulating layer interposed between the transparent pixel electrode and the transparent common electrode, in the pixel region to adjust transmittance by applying an electric field to the liquid crystal layer, the transparent common electrode has a plurality of bars having a predetermined width in a direction substantially parallel to the data lines, the transparent common electrode has a first bar formed to cover the data line and a second bar formed adjacent to the first bar in a central area of the pixel region, a distance between the first bar and the second bar is larger than a distance between bars formed in the pixel region, and one end of the transparent pixel electrode is disposed between the first bar and the adjacent second bar.

A width of the first bar may be formed to be one to five times larger than a width of the data line.

The one end of the transparent pixel electrode may be closer to the first bar than the second bar, and may be disposed at a center between the first bar and the second bar.

Preferably, when a non-transmission region having a minimum transmittance of less than 10% on the basis of the data line is included in the width of the data line, it is possible to efficiently shade an upper part of the data line even if a shading region on the data line does not exist or is drastically reduced. More preferably, a non-transmission region having a minimum transmittance of less than 7% on the basis of the data line may be included in the width of the data line.

The transparent pixel electrode may have a plate shape, or a bar and slit type shape.

When the transparent common electrodes of respective pixel regions are connected to each other and the same voltage is applied to the transparent common electrodes, the transparent common electrode may reduce an entire resistance.

Another aspect of the present invention provides an FFS mode LCD in which a lower substrate, an upper substrate and a liquid crystal layer interposed between the substrates are included, each pixel region is defined by gate lines and data lines formed to cross each other on the lower substrate, and switching devices are disposed at intersections of the gate lines and the data lines, wherein the FFS mode LCD includes a transparent pixel electrode, and a transparent common electrode disposed apart from the transparent pixel electrode by an insulating layer interposed between the transparent pixel electrode and the transparent common electrode, in the pixel region to adjust transmittance by applying an electric field to the liquid crystal layer, the transparent common electrode has a predetermined width in a direction parallel to the data lines and has a plurality of bars, and one bar is formed to partially or completely cover and insulate the data lines, and an electric field formed in a region including the data line has a smaller vertical electric field component than an electric field formed in a central area of the pixel region.

Meanwhile, when a voltage applied to the transparent pixel electrode and the transparent common electrode, and arrangement, a slit distance, etc., of the respective electrodes are adjusted, transmittances of the data line and an adjacent region may be remarkably reduced. Thus, it is possible to remove a shading region on the data line and the adjacent region or drastically reduce an area in which the shading region is formed, and also prevent disclination.

Still another aspect of the present invention provides an FFS mode LCD in which a lower substrate, an upper substrate and a liquid crystal layer interposed between the substrates are included, each pixel region is defined by gate lines and data lines formed to cross each other on the lower substrate, and switching devices are disposed at intersections of the gate lines and the data lines, wherein the FFS mode LCD includes a transparent pixel electrode, and a transparent common electrode disposed apart from the transparent pixel electrode by an insulating layer interposed between the transparent pixel electrode and the transparent common electrode in a non-opening region in which the gate lines and the data lines are formed, in the pixel region to adjust a transmittance by applying an electric field to the liquid crystal layer, and a metal line of a specific thickness is formed to be electrically connected with the transparent common electrode on or under the transparent common electrode of the non-opening region in which the gate lines and the data lines are formed.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 6 is a graph showing minimum transmittances on the basis of a data line;

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

A Fringe Field Switching (FFS) mode Liquid Crystal Display (LCD) includes a lower substrate, an upper substrate and a liquid crystal layer interposed between the substrates. Respective pixel regions are defined by gate lines and data lines formed to cross each other on the lower substrate. Switching devices are disposed at intersections of the gate lines and the data lines. To adjust transmittance by applying an electric field to the liquid crystal layer, the FFS mode LCD has a transparent pixel electrode in the pixel regions and a transparent common electrode disposed apart from the transparent pixel electrode by an insulating layer interposed between the transparent pixel electrode and the transparent common electrode to partially overlap the transparent pixel electrode.

Figure 1A:
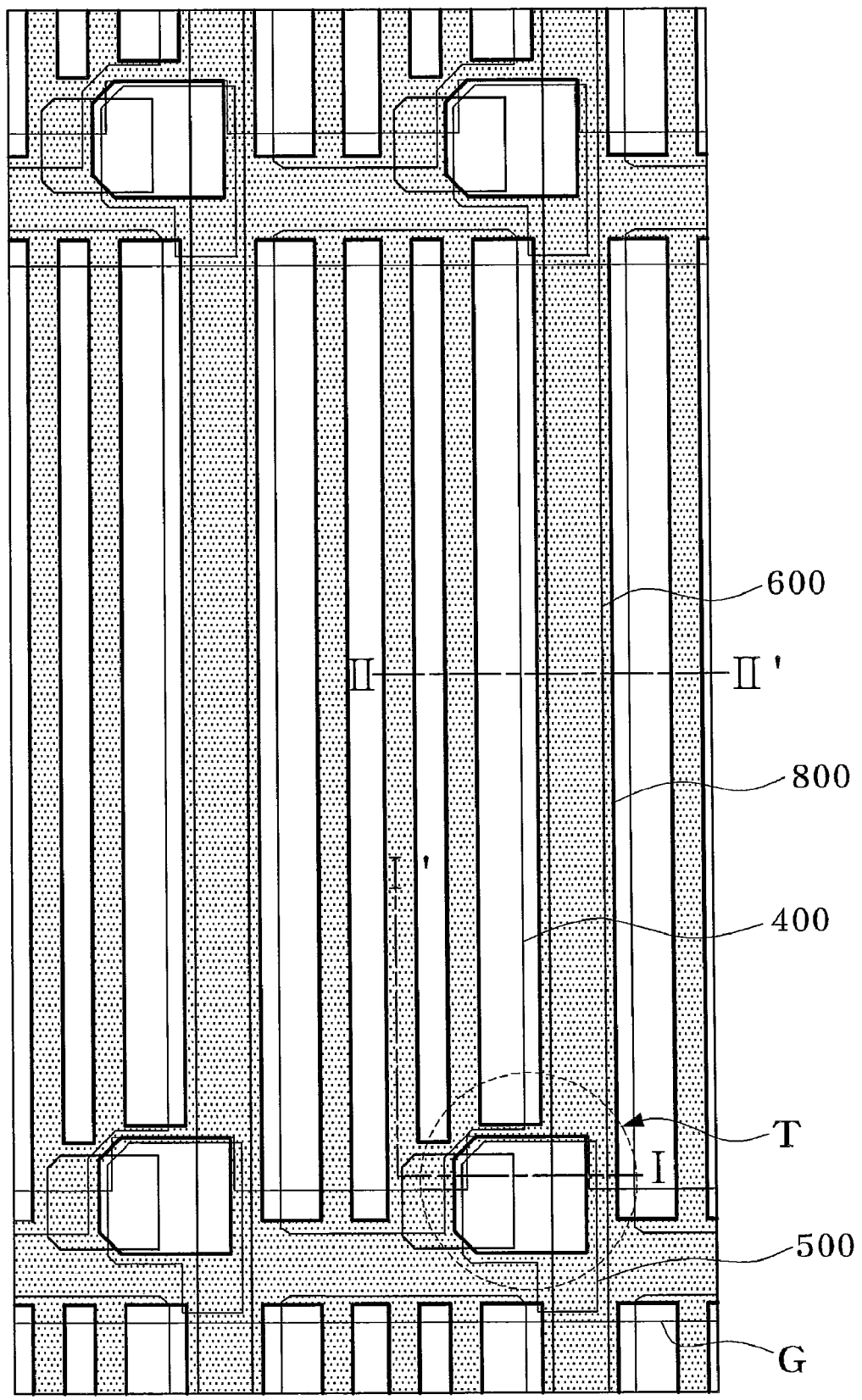
FIGS. 1A to 1E are plan views showing the process of forming layers of a pixel region on a lower substrate of a Fringe Field Switching (FFS) mode Liquid Crystal Display (LCD) device according to an exemplary embodiment of the present invention.
Figure 1B:
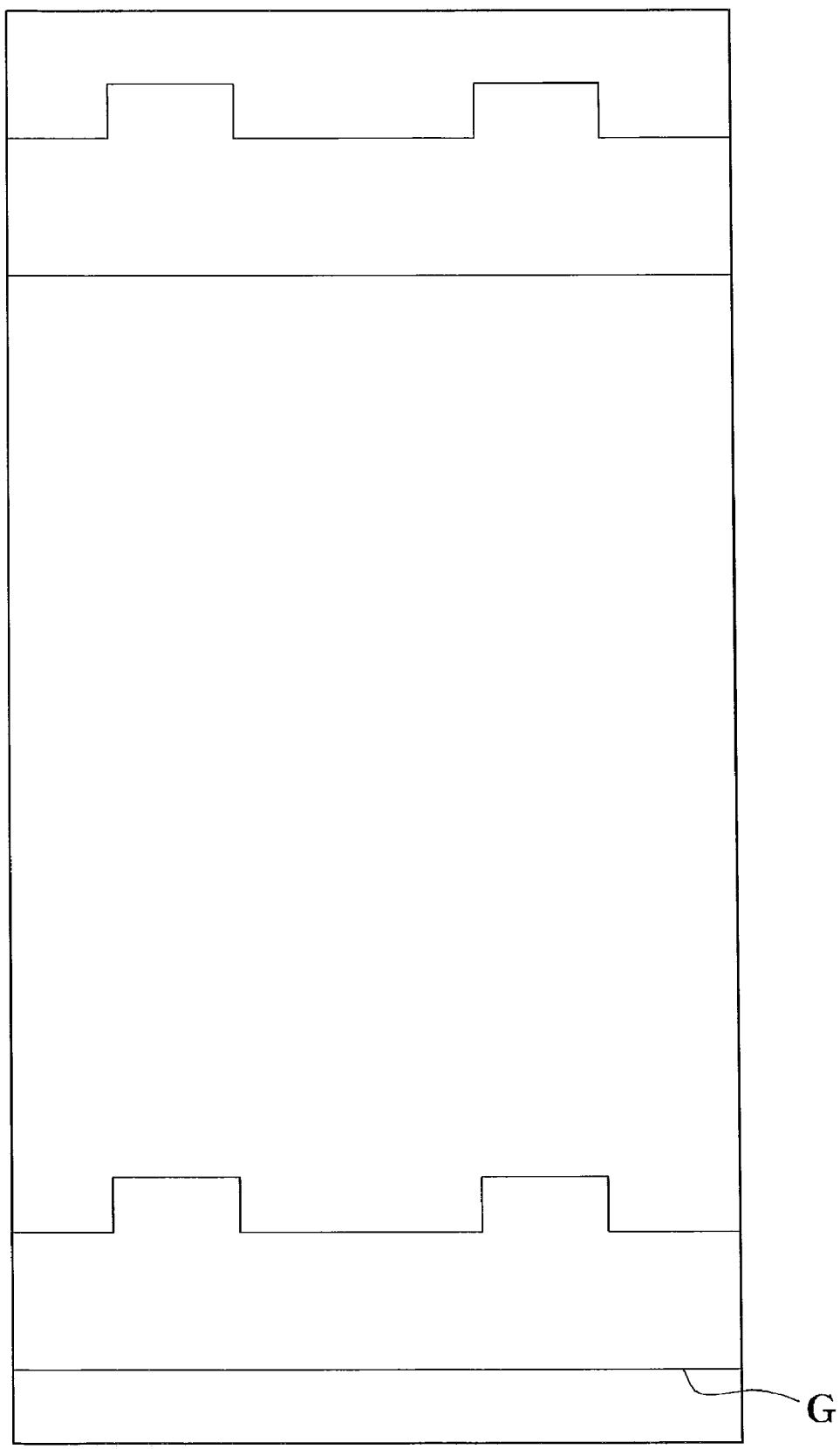
Figure 1C:
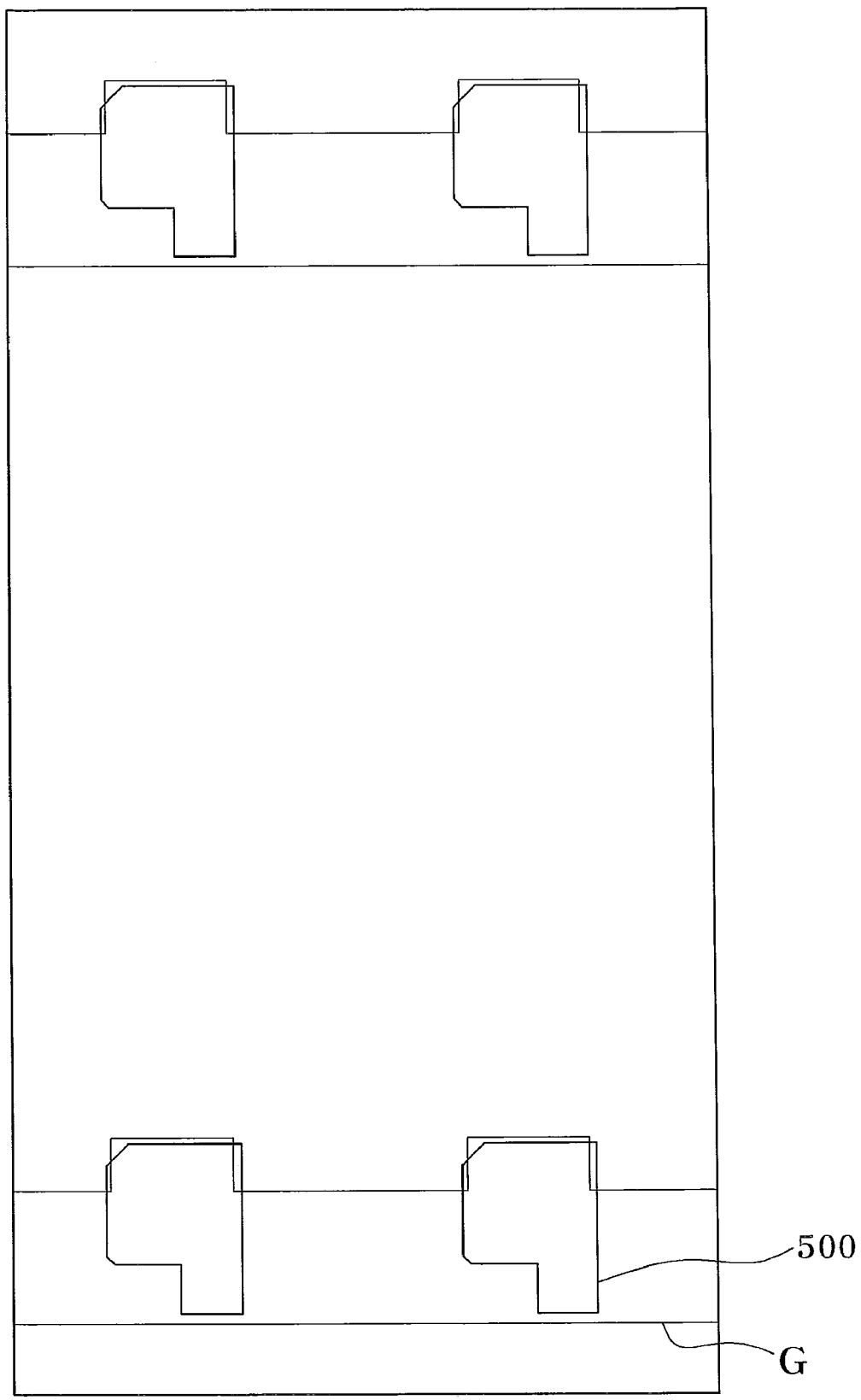
Figure 1D:
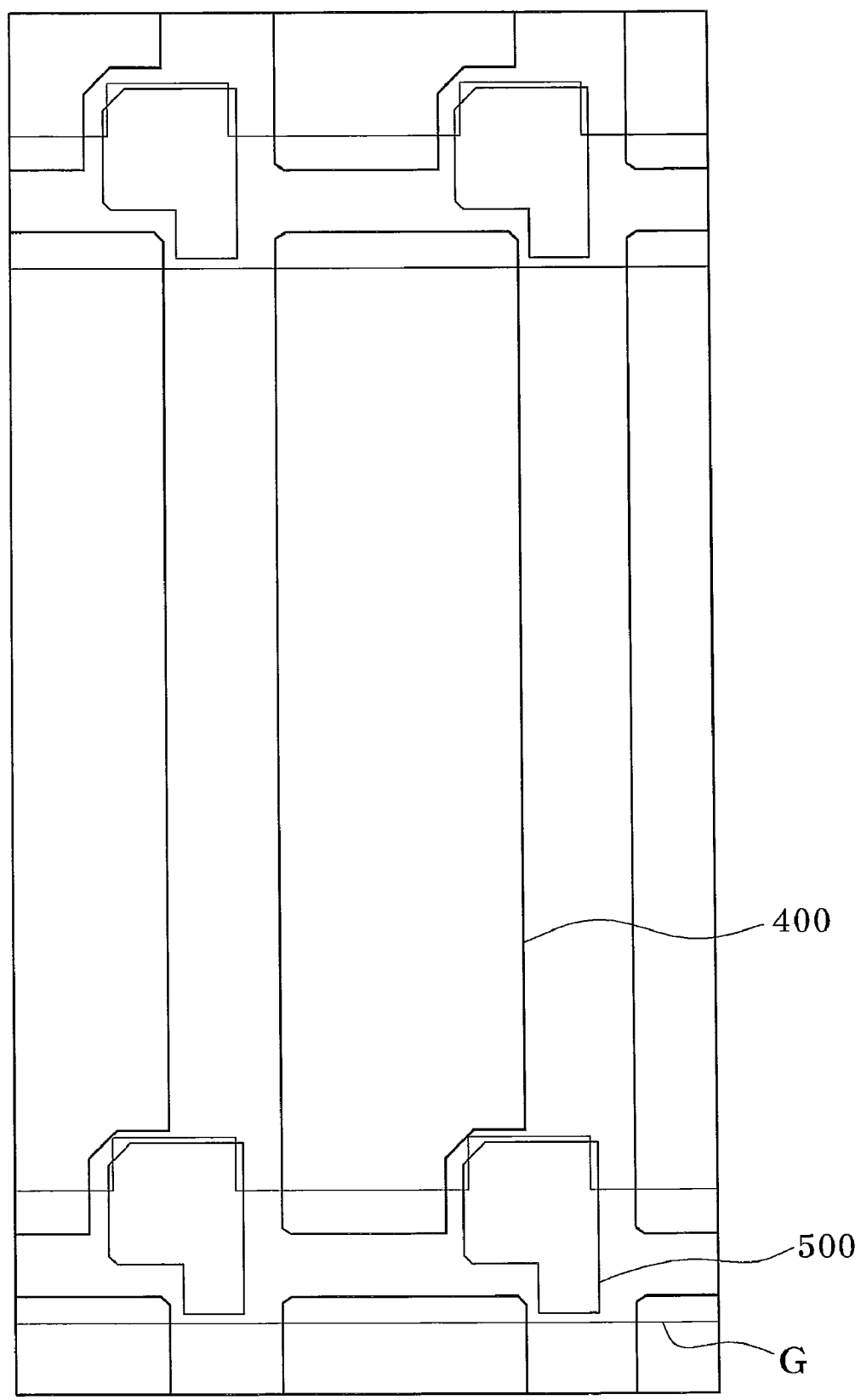
Figure 1E:
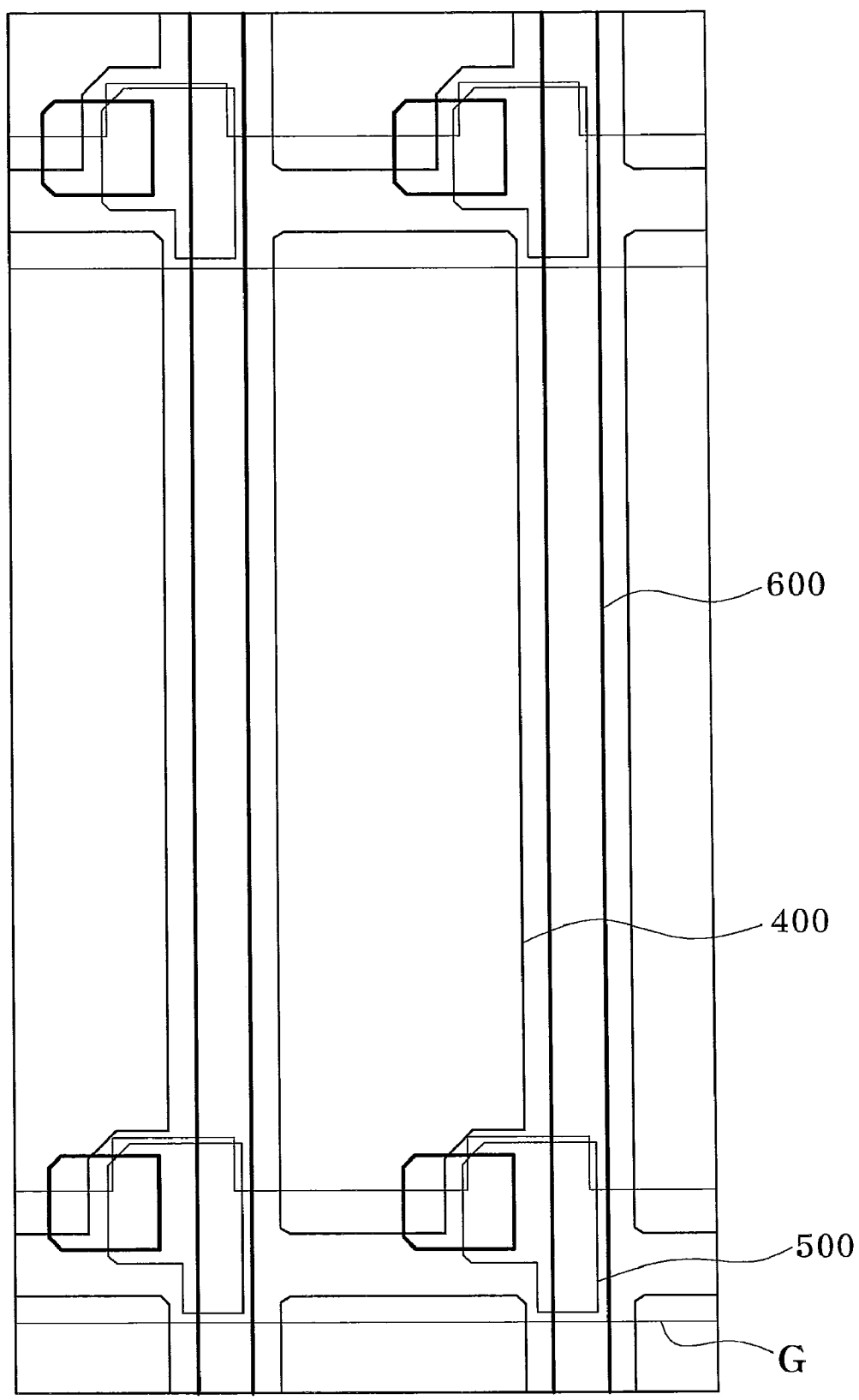
Figure 2:
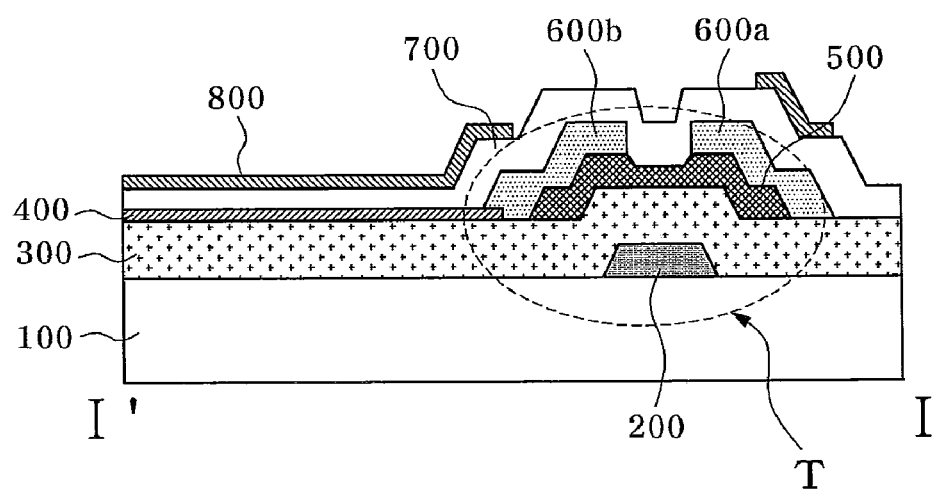
FIG. 2 is a cross-section view taken along line I-I' of FIG. 1A.
Figure 3:
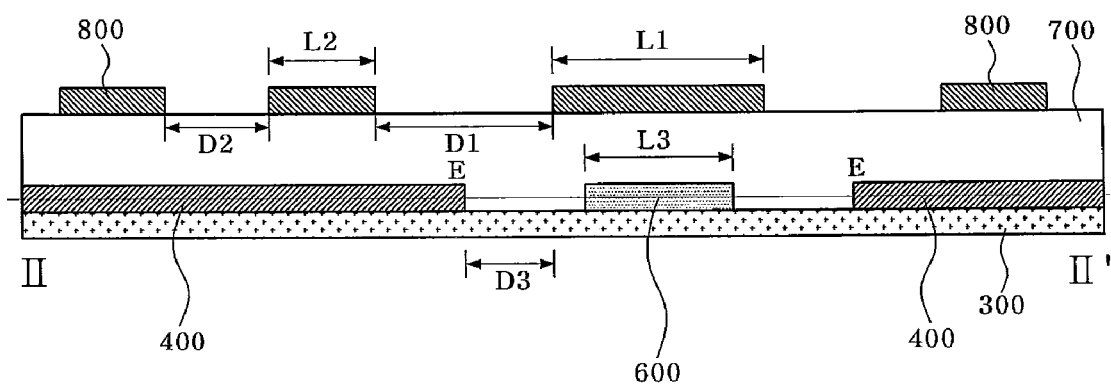
FIG. 3 is a cross-section view taken along line II-II' of FIG. 1A.

FIG. 1A is a plan view of a part of a pixel region formed through a fabrication process on a lower substrate of an FFS mode LCD according to an exemplary embodiment of the present invention. FIGS. 1B to 1E are plan views showing a process of forming and stacking respective layers in sequence. FIG. 2 is a cross-section view taken along line I-I' of FIG. 1A, and FIG. 3 is a cross-section view taken along line II-II' of FIG. 1A.

Referring to FIGS. 1A to 1E, 2 and 3, a gate line G made of an opaque metal and a data line 600 are arranged to cross at right angles on a lower substrate 100, thereby forming a unit pixel. In such a unit pixel region, a transparent common electrode 800 and a transparent pixel electrode 400 are disposed with an insulating layer 700 interposed between the two electrodes 800 and 400. The transparent pixel electrode 400 is disposed in the form of, for example, a plate on the same layer as the data line 600, and the transparent common electrode 800 is formed to have a plurality of bars by patterning a transparent conductive layer deposited on the insulating layer 700 and partially overlaps the transparent pixel electrode 400.

On the gate electrode 200 in the gate line G, an active pattern 500 having a sequentially deposited amorphous silicon (a-Si) layer and n+ a-Si layer and source and drain electrodes 600a and 600b are disposed with a gate insulating layer 300 interposed between the gate electrode 200 and the active pattern 500, thereby forming a Thin Film Transistor (TFT) T. The drain electrode 600b is electrically connected with the transparent pixel electrode 400 to apply a data signal to the unit pixel.

Meanwhile, a color filter (not shown in the drawings) corresponding to each pixel region formed on the lower substrate 100 and expressing a color of a screen is disposed on an upper substrate. A shading region, e.g., a black matrix, on the data line 600 may be removed, unlike the conventional art, or formed to be reduced in comparison with the conventional art. Preferably, the shading region is removed from the data line 600, unlike the conventional art. In addition, the transparent common electrode 800 is not formed on the data line 600 in the conventional art, but is formed on the data line 600 in an exemplary embodiment of the present invention.

A method of fabricating an FFS mode LCD will now be described in detail with reference to FIGS. 1A to 1E, 2 and 3.

Referring to FIGS. 1A to 1E, 2 and 3, the gate line G including the gate electrode 200 is formed on the lower substrate 100. More specifically, an opaque metal layer is deposited and patterned on the lower substrate 100, and thereby the gate line G including the gate electrode 200 is formed in an area of the TFT T on the lower substrate 100.

Subsequently, the gate insulating layer 300 is deposited on the entire lower substrate 100 to cover the gate line G including the gate electrode 200, and then the plate-shaped transparent pixel electrode 400 is formed to be disposed in each pixel region by depositing and patterning a transparent conductive layer on the gate insulating layer 300.

On the resultant substrate, an a-Si layer and an n+ a-Si layer are deposited in sequence and patterned to form the active pattern 500 on the gate insulating layer 300 above the gate electrode 200.

After a metal layer for source and drain is deposited, it is patterned to form the data line 600 including the source and drain electrodes 600a and 600b, thereby forming the TFT T. Here, the drain electrode 600b is formed to be electrically connected with the pixel electrode 400.

Subsequently, the insulating layer 700 made of, for example, silicon nitride (SiNx) is deposited on the resultant structure in which the TFT T is formed, and then the transparent common electrode 800 having a bar and slit shape is formed to partially or completely overlap the transparent pixel electrode 400. After this, although not shown in the drawings, an alignment layer is deposited on the uppermost part of the resultant substrate in which the common electrode 800 is formed, thereby completing fabrication of an array substrate.

Meanwhile, a color filter is selectively formed on the upper substrate, and the alignment layer is formed on the resultant substrate. The upper substrate and the lower substrate 100 are attached with a liquid crystal layer interposed between the substrates, thereby completing an FFS mode LCD according to an exemplary embodiment of the present invention. Needless to say, polarizers may be attached on external surfaces of the respective substrates after the substrates are attached together.

In FIG. 1A, the transparent pixel electrode 400 is shown in the form of a plate. The transparent pixel electrode 400 may have a bar and slit shape, etc., but the plate shape is more effective than other shapes.

Figure 4:
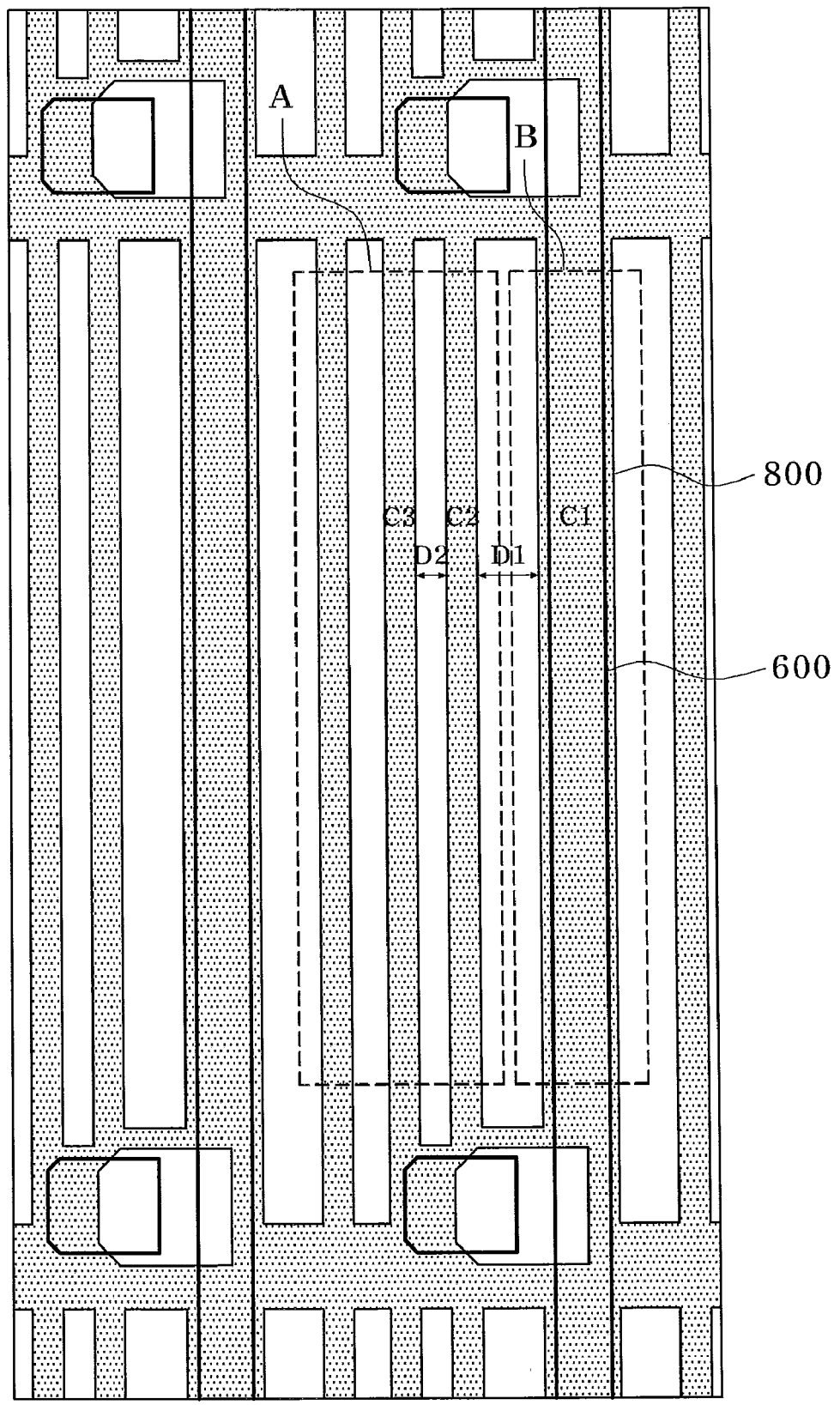
FIG. 4 is a plan view showing some layers of FIG. 1A.

Referring to FIG. 4, the transparent common electrode 800 including a plurality of bars has a structure that covers the entire part except a region in which the TFT T (see FIGS. 1A and 2) is formed and electrically connects respective pixel regions without an interconnection line.

An exemplary embodiment of the present invention will be described in further detail below with reference to FIGS. 3 and 4.

The transparent common electrode 800 has a plurality of bars having a predetermined width in a direction substantially parallel to the data line 600. A first bar $C_1$ of the transparent common electrode 800 is formed to cover the entire data line 600, so that a shading region on the data line 600 employed according to the conventional art may be removed or remarkably reduced.

In other words, the first bar $C_1$ is disposed on the data line 600, and thus it is possible to reduce disclination and increase transmittance. Here, it is effective to form a width $L_1$ of the first bar $C_1$ to be larger than a width $L_3$ of the data line 600 and cover the entire data line 600. In this structure, the first bar $C_1$ can serve to prevent an electric field of the data line 600. Preferably, the width $L_1$ of the first bar $C_1$ is formed to be one to five times larger than the width $L_3$ of the data line 600, and more preferably, it is formed to be 2 to 4.5 times the width $L_3$ of the data line 600.

A distance $D_1$ between the first bar $C_1$ and a second bar $C_2$ of the transparent common electrode 800 is formed to be larger than a distance $D_2$ between bars formed in a pixel. In this structure, an electric field formed in a region B including the data line 600 by the transparent pixel electrode 400, the transparent common electrode 800 and the data line 600 has a smaller vertical electric field component than an electric field formed in a central area A of a pixel region by the transparent pixel electrode 400 and the transparent common electrode 800. The distance $D_1$ between the first bar $C_1$ and the adjacent second bar $C_2$ may be formed to be larger than the distance $D_2$ between bars formed in the pixel by 0.5 to 3 μm.

Preferably, a width $L_2$ of the second bar $C_2$ is formed to be smaller than the distance $D_1$ between the first bar $C_1$ and the second bar $C_2$, and to be smaller than the distance $D_2$ between the second bar $C_2$ and a third bar $C_3$ adjacent to the second bar $C_2$ in a direction of the pixel region. More preferably, the width $L_2$ of the second bar $C_2$ is formed to be smaller than the distance $D_1$ between the first bar $C_1$ and the second bar $C_2$ by 2 to 4 μm. In addition, the width $L_2$ of the second bar $C_2$ is formed to be smaller than the distance $D_2$ between the second bar $C_2$ and the third bar $C_3$ by 1.5 to 2.5 μm.

One end E of the transparent pixel electrode 400 is disposed between the first bar $C_1$ and the adjacent second bar $C_2$ of the transparent common electrode 800 covering the data line 600. Preferably, the one end E of the transparent pixel electrode 400 is closer to the first bar $C_1$ than the second bar $C_2$. More preferably, the one end E of the transparent pixel electrode 400 is disposed at a central part between the first bar $C_1$ and the second bar $C_2$. The term "central part" denotes a substantially central region, and the central part may have a predetermined error (within about ±0.5 μm to the left and right of the accurate center) in comparison with the accurate center in an actual process.

Meanwhile, in this structure, a non-transmission region can be formed on the data line 600 to have a width similar to that of the data line 600, and it is possible to reduce the deterioration of transmittance and prevent light leakage. Therefore, light can be blocked even when a shading region on the data line 600 employed by the conventional art is reduced or removed.

FIGS. 5A to 5D show simulation results for comparing transmittances varying according to a position between the first bar $C_1$ and the second bar $C_2$ at which the one end E of the transparent pixel electrode 400 is disposed in an exemplary embodiment of the present invention.

Figure 5A:
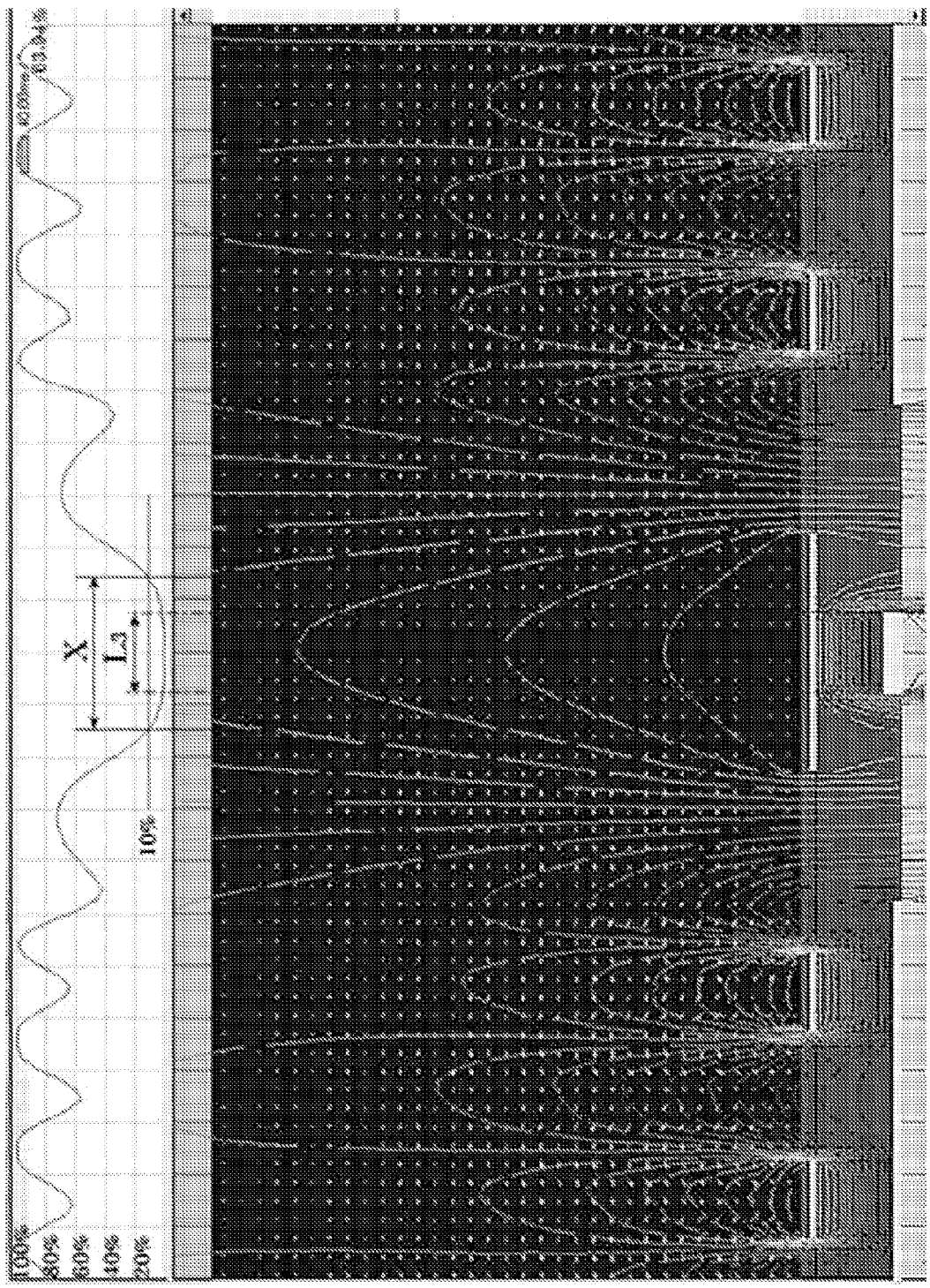
FIGS. 5A to 5D show simulation results for comparing transmittances varying according to a position at which one end of a transparent pixel electrode is disposed according to an exemplary embodiment of the present invention.

Referring to FIGS. 5A to 5D, when the one end E of the transparent pixel electrode 400 is disposed to be closer to the second bar $C_2$ than the first bar $C_1$, the transmittance is 63.94% (see FIG. 5A). When the one end E of the transparent pixel electrode 400 is disposed at the accurate center between the first bar $C_1$ and the second bar $C_2$, the transmittance is 74.46% (see FIG. 5B). When the one end E of the transparent pixel electrode 400 is disposed to be close to the first bar $C_1$, the transmittance is 75.72% (see FIG. 5C). When the one end E of the transparent pixel electrode 400 is extended to the first bar $C_1$, the transmittance is 76.12% (see FIG. 5D). Theoretically, the transmittances of FIGS. 5A to 5D will be divided by two in case that polarization plate is added.

In the case of FIG. 5A, when a region corresponding to the minimum transmittance, e.g., less than 10%, is considered as a non-transmission region, a width X of the non-transmission region is formed to be relatively larger than the width $L_3$ of the data line 600. Thus, an aperture ratio is reduced, and also the transmittance is totally low.

Figure 5B:
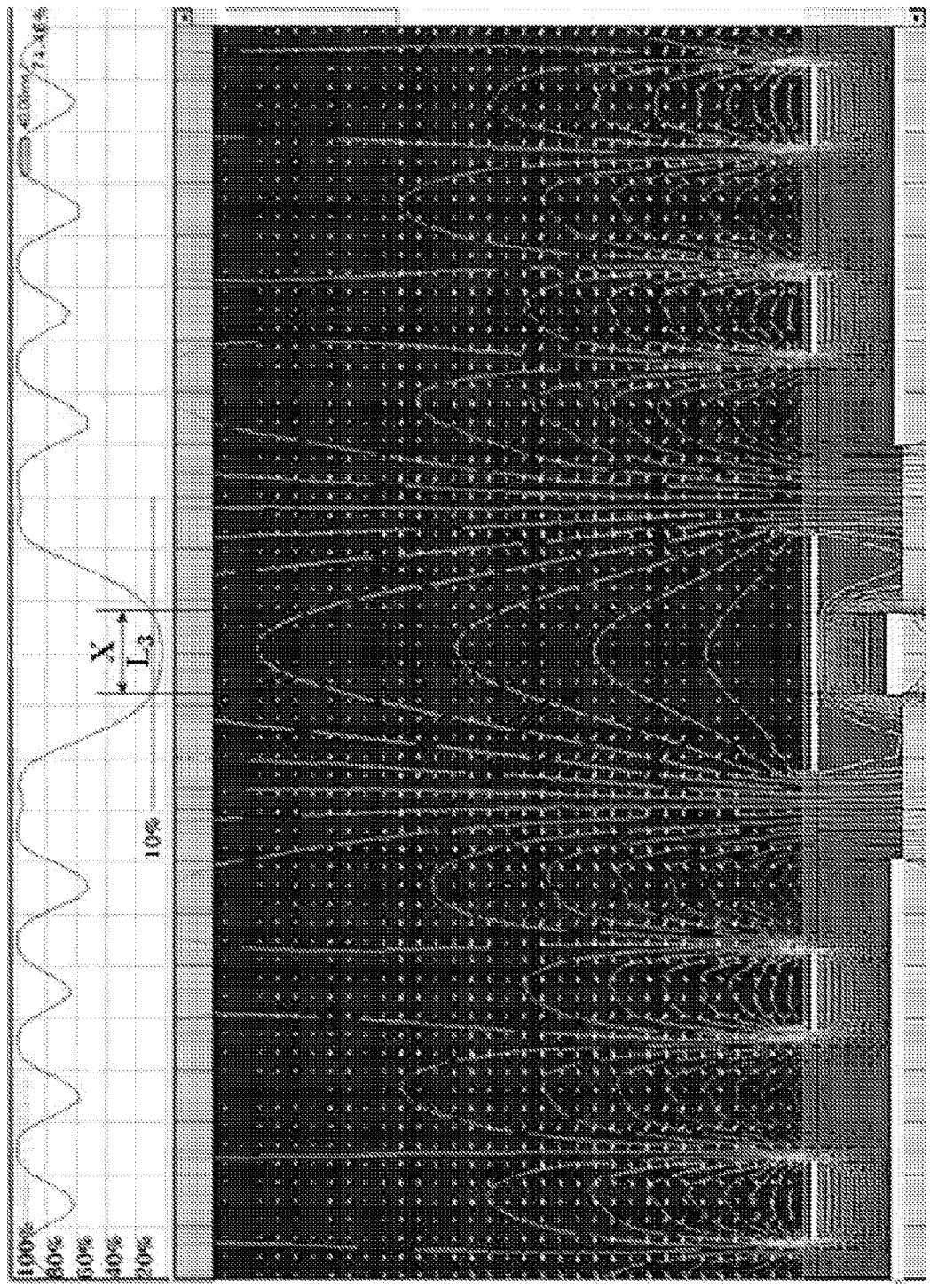
Figure 5C:
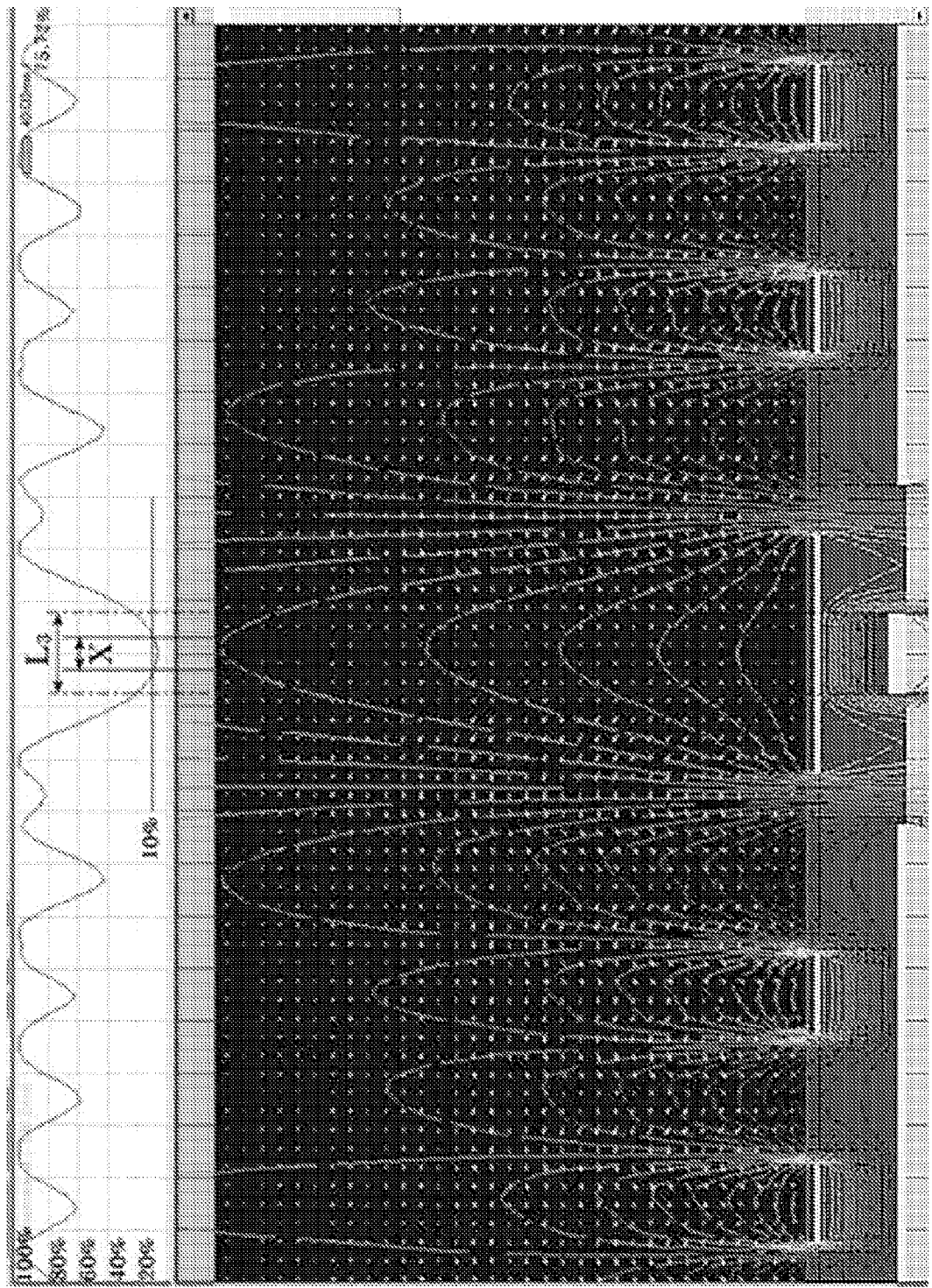
Figure 5D:
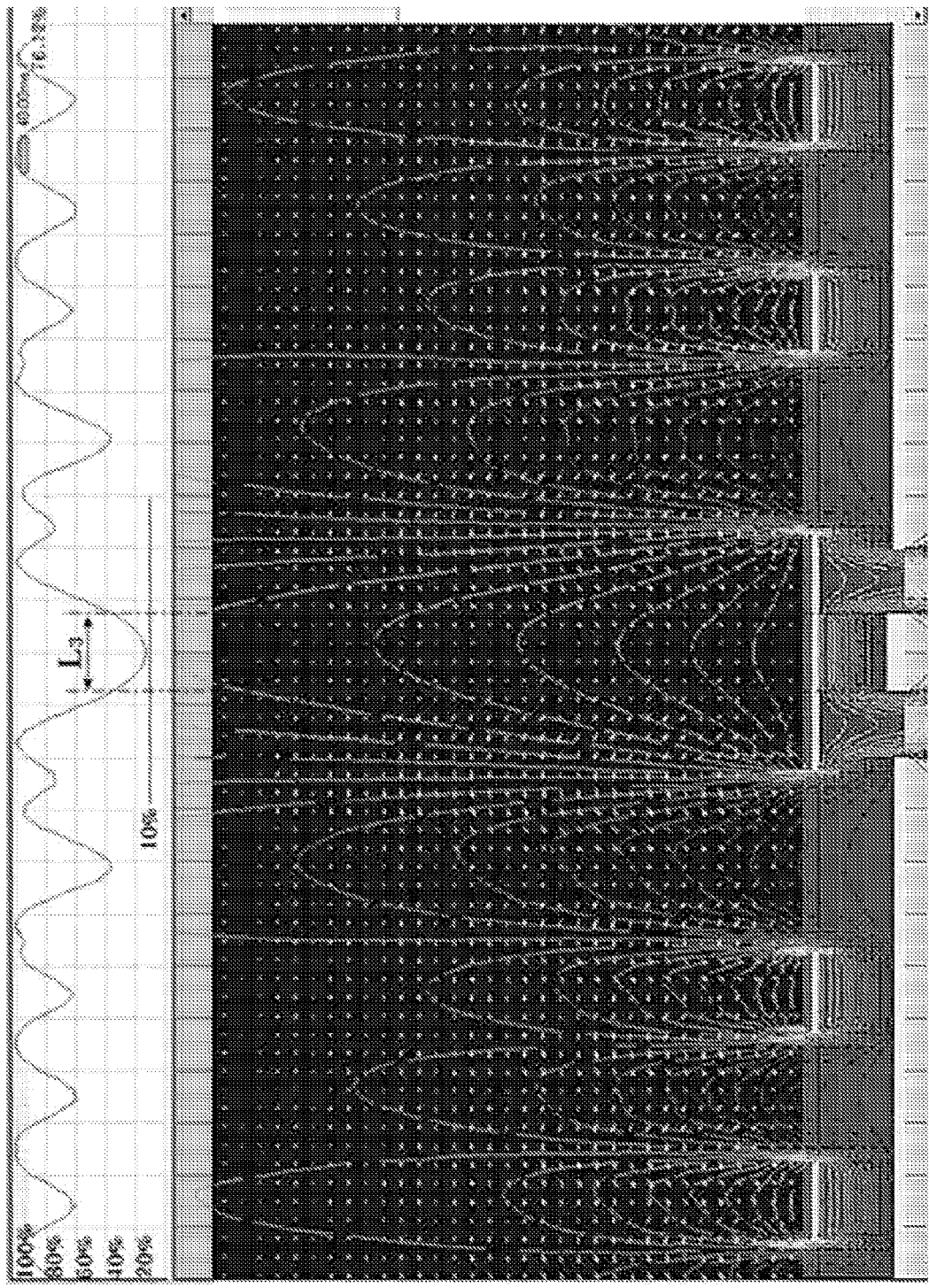

In the case of FIG. 5D, the transmittance is high, but the minimum point of a transmittance curve corresponding to an upper part of the data line 600 is higher than 10%. Thus, a non-transmission region is almost not formed, and light leakage occurs. Consequently, it is not possible to remove or reduce a shading region on the data line 600.

The inventors of the present invention have found that it is more effective that the one end E of the transparent pixel electrode 400 is disposed closer to the first bar $C_1$ than the second bar $C_2$ between the first bar $C_1$ and the second bar $C_2$, or disposed at the central part between the first bar $C_1$ and the second bar $C_2$, as the case of FIG. 5B or 5C.

Referring to FIGS. 5B and 5C, when a region corresponding to the minimum transmittance, e.g., less than 10%, is considered as a non-transmission region, the width X of the non-transmission region can be formed to be equal to or smaller than the width $L_3$ of the data line 600. More specifically, the inventors of the present invention have found that in the non-transmission region, it is possible to ensure transmittance, prevent light leakage, and form an appropriate non-transmission region similar to the data line 600.

Meanwhile, in FIG. 5A, transmittance in the upper part of the data line 600 yields a curve reduced from a maximum value much lower than the maximum value of a pixel region, and thus the transmittance is totally reduced. In FIG. 5D, the minimum transmittance in the upper part of the data line 600 is higher than that of FIGS. 5A, 5B and 5C, and thus a non-transmission region is not formed.

This will be described in further detail with reference to FIG. 6.

FIG. 6 is a graph showing minimum transmittances on the basis of the data line 600. Referring to FIG. 6, parabolic transmittance curves are shown, which have minimum points at the center of the data line 600 (see FIGS. 5A to 5D).

Here, assuming that a region in which a transmittance curve corresponds to 10% or less is defined as a non-transmission region, the inventors of the present invention have found that the effect of the present invention is the best when a non-transmission region is formed to be equal to or smaller than the width $L_3$ of the data line 600.

In other words, when transmittance curves (a) to (d) are shown as in FIG. 6, the width $L_3$ of the data line 600 is compared with the width of a non-transmission region of each transmittance curve. Then, the transmittance curve (a) is excessively larger than the width $L_3$ of the data line 600, the transmittance curve (b) has a non-transmission region of a similar size to the width $L_3$ of the data line 600, the transmittance curve (c) is smaller than the width $L_3$ of the data line 600, and the transmittance curve (d) does not have a non-transmission region.

Meanwhile, when a non-transmission region of a transmittance curve is equal to or smaller than the width $L_3$ of the data line 600, the transmittance is ensured, light leakage is prevented, and an appropriate non-transmission region is formed to be similar to the data line 600. Thus, it is possible not to have a shading region (generally formed on a substrate) or to form a remarkably reduced shading region.

In FIG. 6, a non-transmission region has a transmittance of less than 10%. Preferably, a region having a transmittance of less than 10% is determined as a non-transmission region, but the transmittance may be less than 5% or less than 7%.

Figure 7:
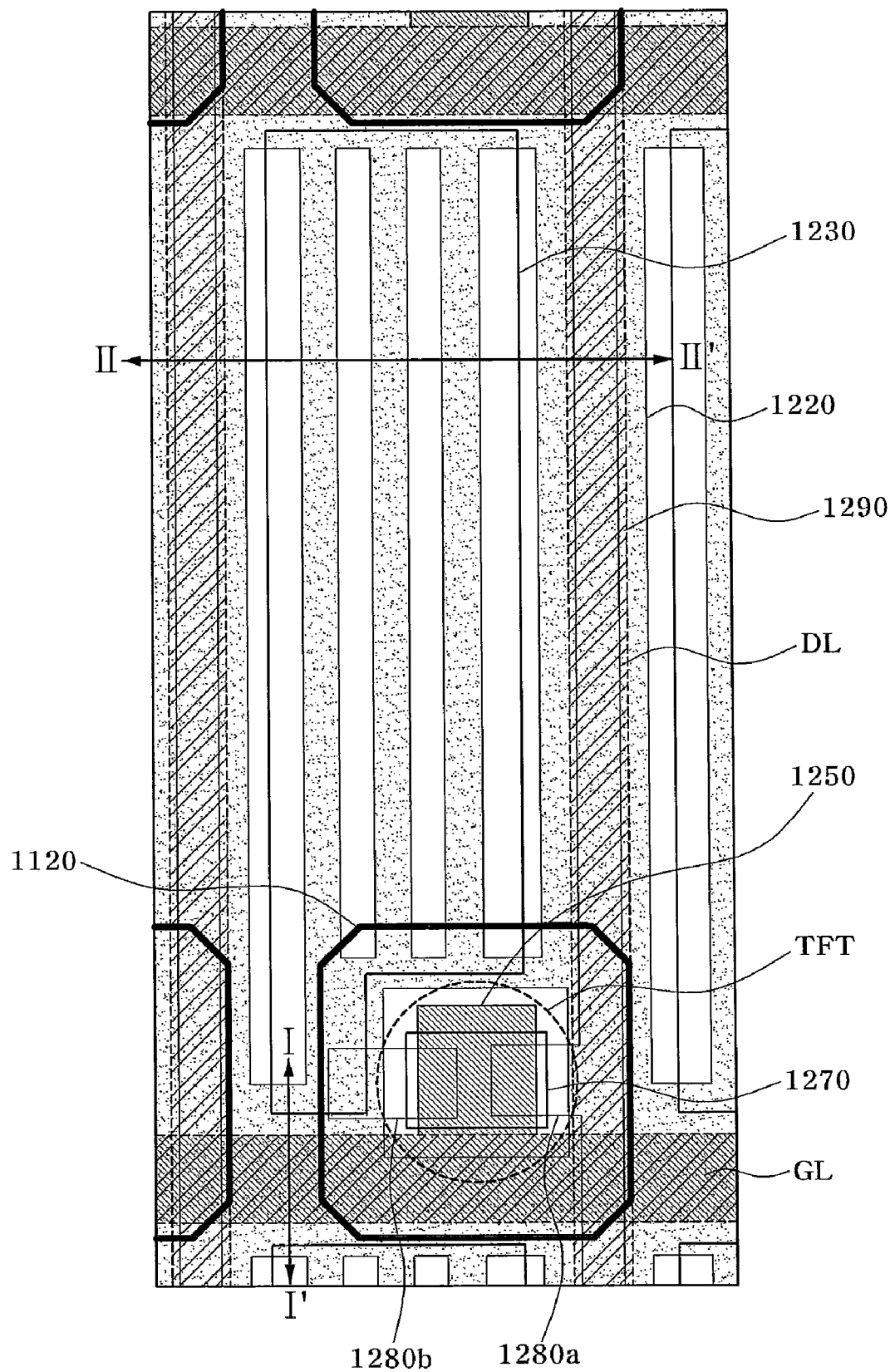
FIG. 7 is a plan view of an FFS mode LCD device according to another exemplary embodiment of the present invention.
Figure 8:
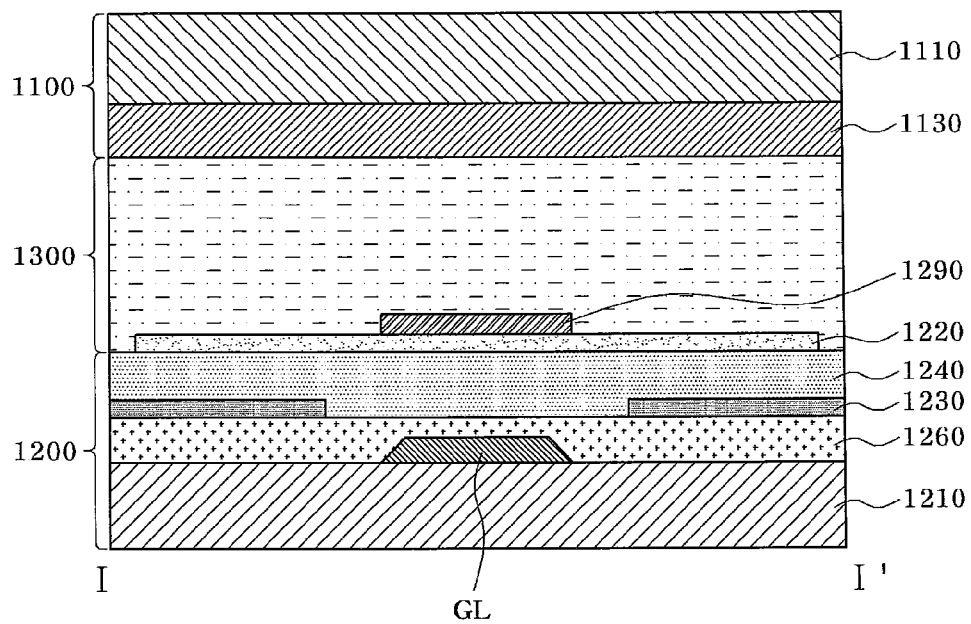
FIG. 8 is a cross-section view taken along line I-I' of FIG. 7.
Figure 9:
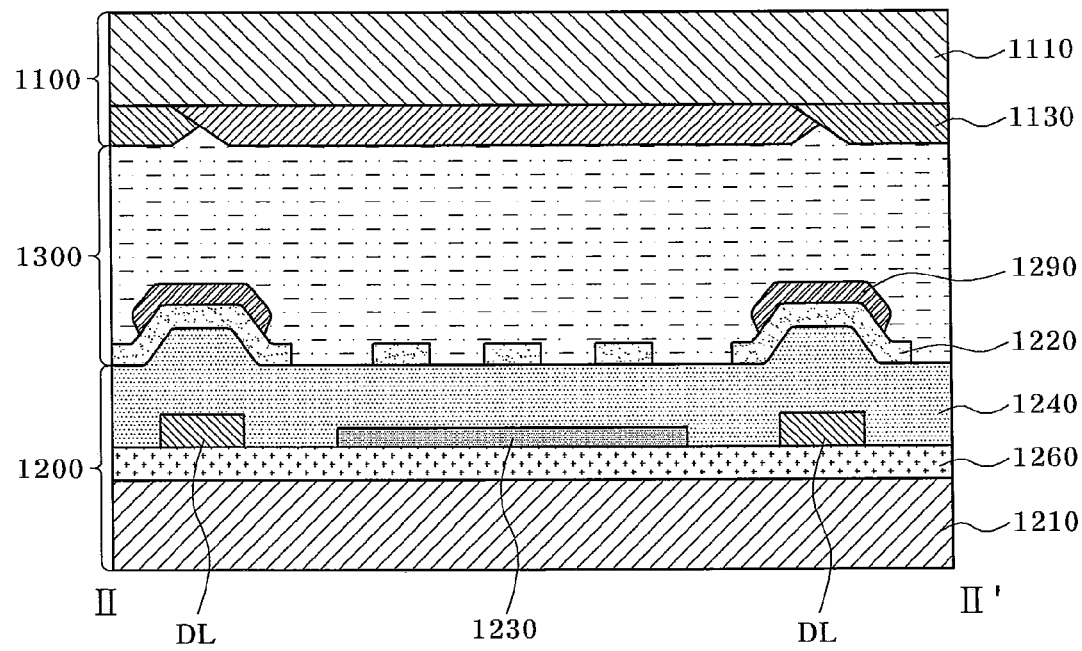
FIG. 9 is a cross-section view taken along line II-II' of FIG. 7.
Figure 10:
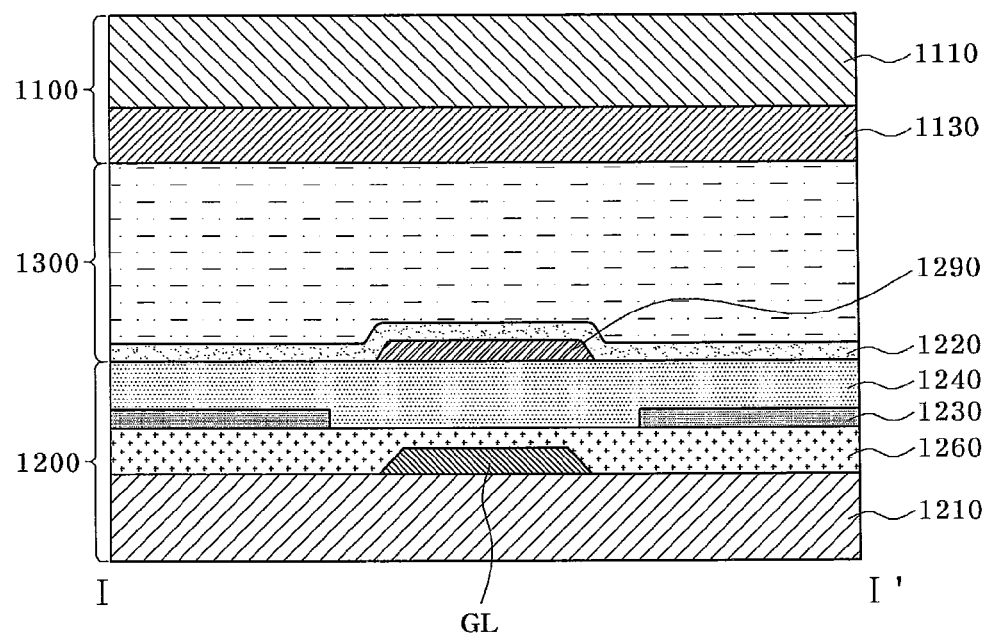
FIG. 10 is a cross-section view taken along line I-I' of a modified embodiment of FIG. 7.
Figure 11:
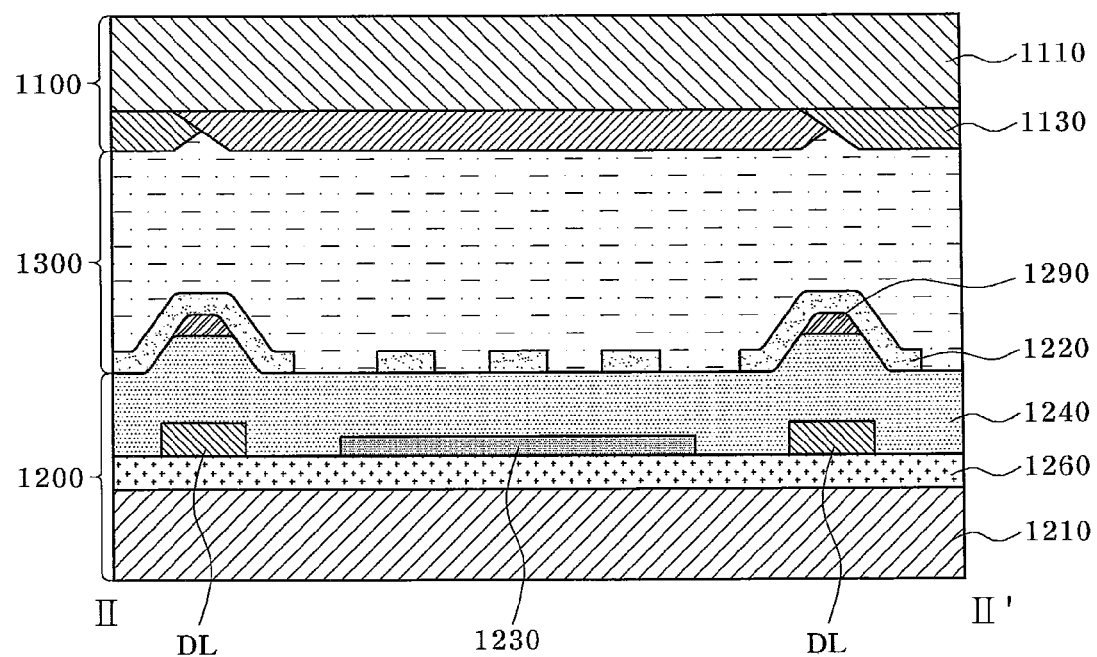
FIG. 11 is a cross-section view taken along line II-II' of a modified embodiment of FIG. 7.

FIG. 7 is a plan view of an FFS mode LCD device according to another exemplary embodiment of the present invention. FIG. 8 is a cross-section view taken along line I-I' of FIG. 7, and FIG. 9 is a cross-section view taken along line II-II' of FIG. 7. FIG. 10 is a cross-section view taken along line I-I' of a modified embodiment of FIG. 7, and FIG. 11 is a cross-section view taken along line II-II' of a modified embodiment of FIG. 7.

Referring to FIGS. 7 to 11, the FFS mode LCD according to another exemplary embodiment of the present invention roughly includes an upper substrate 1100 and a lower substrate 1200 attached together facing each other, and a liquid crystal layer 1300 filled in a liquid crystal space prepared by the two substrates and a spacer (not shown).

Here, the upper substrate 1100 is generally referred to as a color filter substrate, and roughly includes an insulating substrate 1110, a shading region 1120, a color filter 1130, and so on.

The shading region 1120 is a shading unit for preventing light leakage and formed at specific intervals on the substrate 1110. In general, the shading regions 1120 define boundaries of Red (R), Green (G) and Blue (B) color filters and are formed of a photosensitive organic material including black pigment.

The color filter 1130 includes Red (R), Green (G) and Blue (B) color filter patterns arranged between the respective shading regions 1120, and serves to impart a color to light irradiated from a backlight unit (not shown) and passed through the liquid crystal layer 1300.

More specifically, gate lines GL and data lines DL formed of an opaque metal are arranged to cross at right angles on the lower substrate 1200 to form a unit pixel. In the unit pixel region, a transparent common electrode 1220 and a transparent pixel electrode 1230 are disposed with an insulating layer 1240 interposed between the two electrodes 1220 and 1230. The transparent pixel electrode 1230 is disposed in the form of, for example, a plate on the same layer as the data line DL, and the transparent common electrode 1220 is formed to have a plurality of bar by patterning a transparent conductive layer deposited on the insulating layer 1240 and partially overlaps the transparent pixel electrode 1230.

On a gate electrode 1250 in the gate line GL, an active pattern 1270 including a sequentially deposited a-Si layer and n+ a-Si layer and source and drain electrodes 1280a and 1280b are disposed with a gate insulating layer 1260 interposed between the gate electrode 1250 and the active pattern 1270, thereby forming a TFT. The drain electrode 1280b is electrically connected with the transparent pixel electrode 1230 to apply a data signal to the unit pixel.

In particular, a low-resistance metal line 1290 for reducing the resistance of the transparent common electrode 1220 is formed to have a specific thickness on the transparent common electrode 1220 in a non-opening region, i.e., a non-transmission region, in which the gate line GL and the data line DL are formed, and is electrically connected with the transparent common electrode 1220.

Here, the thickness of the low-resistance metal line 1290 is about several hundred angstroms (Å), so that the transparent common electrode 1220 formed on the metal line 1290 is not disconnected by a step difference or light leakage caused by a rubbing step difference is minimized. With an increase in size of the LCD, however, the thickness may be about 1000 Å or more to reduce the resistance of the transparent common electrode 1220.

Meanwhile, as illustrated in FIGS. 10 and 11, the low-resistance metal line 1290 may be formed under the transparent common electrode 1220.

The low-resistance metal line 1290 may be formed of a low-resistance metal material including at least one or at least one alloyed metal of, for example, copper (Cu), aluminum (Al), aluminum neodymium (AlNd), molybdenum (Mo), titanium (Ti) and molybdenum-tungsten (MoW).

As described above, the low-resistance metal line 1290 is formed for electrical connection on or under the transparent common electrode 1220 in the non-opening region through which the gate line GL and the data line DL pass to reduce the resistance of the transparent common electrode 1220. Thus, it is possible to effectively reduce a common electrode line (Vcom) load in a liquid crystal panel and efficiently solve a picture quality problem, such as greenish, flicker, etc., caused by an increase of the Vcom load.

According to the inventive FFS mode LCD, it is possible to remove or reduce a shading region formed on a data line among shading regions serving to block light, and prevent light leakage and disclination.

In addition, the present invention adjusts the width, arrangement, etc., of a data line, a transparent common electrode and a transparent pixel electrode, and thereby increases an aperture ratio at the minimum cost without a particular process.

Furthermore, the present invention can be easily applied to a liquid crystal panel of an FFS structure having high brightness without a picture quality problem, such as reduction in aperture ratio, greenish, etc., in a medium-size liquid crystal panel, e.g., Note Book Application, as well as a small-size liquid crystal panel.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A Fringe Field Switching (FFS) mode Liquid Crystal Display (LCD) in which a lower substrate, an upper substrate and a liquid crystal layer interposed between the substrates are included, each pixel region is defined by gate lines and data lines formed to cross each other on the lower substrate, and switching devices are disposed at intersections of the gate lines and the data lines, wherein the FFS mode LCD comprises a transparent pixel electrode, and a transparent common electrode disposed apart from the transparent pixel electrode by an insulating layer interposed therebetween to adjust a transmittance by applying an electric field to the liquid crystal layer, and a metal line of a specific thickness is formed to be electrically connected with the transparent common electrode on or under the transparent common electrode of a non-opening region in which the gate lines and the data lines are formed.

2. The FFS mode LCD of claim 1, wherein the metal line is formed of a low-resistance metal material including at least one or at least one alloyed metal of copper (Cu), aluminum (Al), aluminum neodymium (AlNd), molybdenum (Mo), titanium (Ti) and molybdenum-tungsten (MoW).

3. The FFS mode LCD of claim 1, the transparent common electrode has a plurality of bars having a predetermined width in a direction substantially parallel to the data lines, the transparent common electrode has a first bar formed to cover the data line and a second bar formed adjacent to the first bar in a central area of the pixel region, a distance between the first bar and the second bar is larger than a distance between bars formed in the pixel region, and one end of the transparent pixel electrode is disposed between the first bar and the second bar.

4. The FFS mode LCD of claim 3, wherein a width of the first bar of the transparent common electrode covering the data line is larger than a width of the adjacent second bar of the transparent common electrode.

5. The FFS mode LCD of claim 1, wherein the transparent pixel electrode is disposed on the same layer as the data line.

6. The FFS mode LCD of claim 1, wherein the transparent pixel electrode and the data line are disposed with the insulating layer interposed therebetween.

7. The FFS mode LCD of claim 3, wherein the one end of the transparent pixel electrode is closer to the first bar than the second bar.

8. The FFS mode LCD of claim 3, wherein the one end of the transparent pixel electrode is disposed at a central part between the first bar and the second bar.

9. The FFS mode LCD of claim 1, wherein a non-transmission region having a minimum transmittance of less than 10% on the basis of the data line is included in a width of the data line.

10. The FFS mode LCD of claim 1, wherein a non-transmission region having a minimum transmittance of less than 7% on the basis of the data line is included in a width of the data line.

11. The FFS mode LCD of claim 1, wherein the transparent pixel electrode has a plate shape, or a bar and slit shape.

12. The FFS mode LCD of claim 1, wherein the transparent common electrodes of respective pixel regions are connected to each other and the same voltage is applied to the transparent common electrodes.

13. The FFS mode LCD of claim 1, the transparent common electrode has a predetermined width in a direction parallel to the data lines and has a plurality of bars, and one bar is formed to partially or completely cover and insulate the data lines, and an electric field formed in a region including the data line has a smaller vertical electric field component than an electric field formed in a central area of the pixel region.

14. The FFS mode LCD of claim 1, wherein the transparent common electrode has a first bar completely covering the data line and a second bar adjacent to the first bar in the pixel region.

15. The FFS mode LCD of claim 14, wherein one end of the transparent pixel electrode is disposed between the first bar and the second bar of the transparent common electrode.

16. The FFS mode LCD of claim 14, wherein one end of the transparent pixel electrode is closer to the first bar than the second bar.

17. The FFS mode LCD of claim 14, wherein one end of the transparent pixel electrode is disposed at a central part between the first bar and the second bar.

* * * * *